(12) United States Patent
Smith

(10) Patent No.: US 6,983,062 B2
(45) Date of Patent: Jan. 3, 2006

(54) FINGERPRINT SCANNER AUTO-CAPTURE SYSTEM AND METHOD

(75) Inventor: David C. Smith, Tequesta, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 477 days.

(21) Appl. No.: 09/821,044

(22) Filed: Mar. 30, 2001

(65) Prior Publication Data

US 2002/0021827 A1 Feb. 21, 2002

Related U.S. Application Data

(60) Provisional application No. 60/226,092, filed on Aug. 18, 2000.

(51) Int. Cl.
G06K 9/00 (2006.01)

(52) U.S. Cl. .................. 382/124; 382/274; 348/229.1; 348/243

(58) Field of Classification Search ................ 352/12.5, 352/125, 169, 274, 232, 130, 173; 358/1.15, 358/504, 461, 501, 474; 348/247; 359/17
See application file for complete search history.

(56) References Cited

U.S. PATENT DOCUMENTS

| 2,500,017 A | 3/1950 | Altman | 88/57 |
| 3,200,701 A | 8/1965 | White | 88/14 |
| 3,475,588 A | 10/1969 | McMaster | |

(Continued)

FOREIGN PATENT DOCUMENTS

| EP | 0 101 772 A1 | 3/1984 |
| EP | 0 308 162 A2 | 3/1989 |
| EP | 0 379 333 A1 | 7/1990 |

(Continued)

OTHER PUBLICATIONS

English–language Abstract of Japanese Patent Publication No. 11–225272, 2 Pages (Aug. 17, 1999—Date of Publication of application).

English–language Abstract of Japanese Patent Publication No. 11–289421, 2 Pages (Oct. 19, 1999—Date of publication of application).

English–language Abstract for Japanese Patent Publication No. 62–212892, published Sep. 18, 1987, printed from espacenet.com, 1 page.

English–language Abstract for Japanese Patent Publication No. 1–205392, published Aug. 17, 1989, printed from espacenet.com, 1 page.

(Continued)

Primary Examiner—Kanjibhai Patel
Assistant Examiner—Sheela Chawan
(74) Attorney, Agent, or Firm—Sterne, Kessler, Goldstein & Fox PLLC

(57) ABSTRACT

A system and method of capturing an acceptable fingerprint image is disclosed herein. The method includes a step of capturing an initial fingerprint image at a nominal image integration time. Once this initial fingerprint image is captured, a first intermediate fingerprint image at a first intermediate image integration time is captured. Next, an image darkness test is performed followed by an image definition test. If one or more of these tests indicates that the first intermediate fingerprint image is unacceptable, a subsequent intermediate fingerprint image at a subsequent intermediate image integration time is captured. This subsequent intermediate fingerprint image can be captured before the image definition test is performed. Additional intermediate fingerprint images can be captured until an image that has an acceptable darkness level as a well as an acceptable definition level is captured. Also disclosed is a fingerprint scanner that performs this method.

49 Claims, 9 Drawing Sheets

U.S. PATENT DOCUMENTS

| | | | |
|---|---|---|---|
| 3,482,498 A | 12/1969 | Becker | 95/12 |
| 3,495,259 A | 2/1970 | Rocholl et al. | |
| 3,527,535 A | 9/1970 | Monroe | 356/71 |
| 3,540,025 A | 11/1970 | Levin et al. | |
| 3,617,120 A | 11/1971 | Roka | 353/28 |
| 3,699,519 A | 10/1972 | Campbell | 340/146.3 E |
| 3,906,520 A | 9/1975 | Phillips | |
| 3,947,128 A | 3/1976 | Weinberger et al. | 356/71 |
| 3,968,476 A | 7/1976 | McMahon | 340/146.3 E |
| 3,975,711 A | 8/1976 | McMahon | |
| 4,032,975 A | 6/1977 | Malueg et al. | 358/213 |
| 4,063,226 A | 12/1977 | Kozma et al. | 365/125 |
| 4,120,585 A | 10/1978 | DePalma et al. | |
| 4,152,056 A | 5/1979 | Fowler | |
| 4,209,481 A | 6/1980 | Kashiro et al. | |
| 4,210,899 A | 7/1980 | Swonger et al. | 340/146.3 E |
| 4,253,086 A | 2/1981 | Szwarcbier | |
| 4,322,163 A | 3/1982 | Schiller | |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |
| 4,553,837 A | 11/1985 | Marcus | |
| 4,601,195 A | 7/1986 | Garritano | 73/60 |
| 4,669,487 A | 6/1987 | Frieling | |
| 4,681,435 A | 7/1987 | Kubota et al. | 356/71 |
| 4,684,802 A | 8/1987 | Hakenewerth et al. | |
| 4,701,772 A | 10/1987 | Anderson et al. | |
| 4,783,823 A | 11/1988 | Tasaki et al. | 382/4 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,905,293 A | 2/1990 | Asai et al. | |
| 4,924,085 A | 5/1990 | Kato et al. | 250/227.28 |
| 4,933,976 A | 6/1990 | Fishbine et al. | 382/4 |
| 4,942,482 A | 7/1990 | Kakinuma et al. | |
| 4,946,276 A | 8/1990 | Chilcott | |
| 4,995,086 A | 2/1991 | Lilley et al. | 382/4 |
| 5,047,861 A * | 9/1991 | Houchin et al. | 348/247 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |
| 5,131,038 A | 7/1992 | Puhl et al. | 380/23 |
| 5,146,102 A | 9/1992 | Higuchi et al. | 250/556 |
| 5,157,497 A | 10/1992 | Topper et al. | |
| 5,185,673 A | 2/1993 | Sobol | |
| 5,187,747 A | 2/1993 | Capello et al. | 382/4 |
| 5,210,588 A | 5/1993 | Lee | |
| 5,222,152 A | 6/1993 | Fishbine et al. | 382/2 |
| 5,222,153 A | 6/1993 | Beiswenger | |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| 5,253,085 A | 10/1993 | Maruo et al. | |
| 5,261,266 A | 11/1993 | Lorenz et al. | |
| 5,285,293 A | 2/1994 | Webb et al. | |
| 5,291,318 A | 3/1994 | Genovese | |
| D348,445 S | 7/1994 | Fishbine et al. | D14/107 |
| 5,351,127 A | 9/1994 | King et al. | |
| D351,144 S | 10/1994 | Fishbine et al. | D14/107 |
| 5,363,318 A | 11/1994 | McCauley | |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,448,649 A | 9/1995 | Chen et al. | |
| 5,467,403 A | 11/1995 | Fishbine et al. | 382/116 |
| 5,469,506 A | 11/1995 | Berson et al. | 380/23 |
| 5,471,240 A | 11/1995 | Prager et al. | |
| 5,473,144 A | 12/1995 | Mathurin, Jr. | 235/380 |
| 5,483,601 A | 1/1996 | Faulkner | |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,657,400 A * | 8/1997 | Granfors et al. | 382/254 |
| 5,661,451 A | 8/1997 | Pollag | 340/426 |
| 5,680,205 A | 10/1997 | Borza | 256/71 |
| 5,689,529 A | 11/1997 | Johnson | 375/259 |
| 5,717,777 A | 2/1998 | Wong et al. | 382/124 |
| 5,729,334 A | 3/1998 | Van Ruyven | |
| 5,736,734 A | 4/1998 | Marcus et al. | |
| 5,745,684 A | 4/1998 | Oskouy et al. | 395/200.8 |
| 5,748,766 A | 5/1998 | Maase et al. | 382/124 |
| 5,748,768 A | 5/1998 | Sivers et al. | |
| 5,755,748 A | 5/1998 | Borza | 607/61 |
| 5,757,278 A | 5/1998 | Itsumi | |
| 5,767,989 A | 6/1998 | Sakaguchi | |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,801,681 A | 9/1998 | Sayag | |
| 5,805,777 A | 9/1998 | Kuchta | 395/112 |
| 5,809,172 A | 9/1998 | Melen | |
| 5,812,067 A | 9/1998 | Bergholz et al. | 340/825.31 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,855,433 A | 1/1999 | Velho et al. | |
| 5,859,420 A | 1/1999 | Borza | 250/208.1 |
| 5,859,710 A | 1/1999 | Hannah | |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,892,599 A | 4/1999 | Bahuguna | |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,928,347 A | 7/1999 | Jones | 710/129 |
| 5,942,761 A | 8/1999 | Tuli | |
| 5,946,135 A | 8/1999 | Auerswald et al. | |
| 5,960,100 A | 9/1999 | Hargrove | 382/124 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,991,467 A | 11/1999 | Kamiko | |
| 5,995,014 A | 11/1999 | DiMaria | 340/825.31 |
| 5,999,307 A | 12/1999 | Whitehead et al. | |
| 6,018,739 A | 1/2000 | McCoy et al. | 707/102 |
| 6,023,522 A | 2/2000 | Draganoff et al. | 382/124 |
| 6,038,332 A | 3/2000 | Fishbine et al. | |
| 6,041,372 A | 3/2000 | Hart et al. | 710/62 |
| 6,055,071 A | 4/2000 | Kuwata et al. | |
| 6,064,398 A | 5/2000 | Ellenby et al. | |
| 6,064,753 A | 5/2000 | Bolle et al. | |
| 6,064,779 A | 5/2000 | Neukermans et al. | |

| | | |
|---|---|---|
| 6,072,891 A | 6/2000 | Hamid et al. |
| 6,075,876 A | 6/2000 | Draganoff ................... 382/124 |
| 6,078,265 A | 6/2000 | Bonder et al. ......... 340/825.31 |
| 6,088,585 A | 7/2000 | Schmitt et al. ............. 455/411 |
| 6,097,873 A | 8/2000 | Filas et al. |
| 6,104,809 A | 8/2000 | Berson et al. ................ 380/23 |
| 6,115,484 A | 9/2000 | Bowker et al. |
| 6,122,394 A | 9/2000 | Neukermans et al. |
| 6,134,340 A * | 10/2000 | Hsu et al. .................... 382/124 |
| 6,144,408 A | 11/2000 | MacLean |
| 6,150,665 A | 11/2000 | Suga |
| 6,154,285 A | 11/2000 | Teng et al. |
| 6,162,486 A | 12/2000 | Samouilhan et al. |
| 6,166,787 A | 12/2000 | Akins et al. |
| 6,178,255 B1 | 1/2001 | Scott et al. |
| 6,195,447 B1 | 2/2001 | Ross |
| 6,198,836 B1 | 3/2001 | Hauke |
| 6,204,331 B1 | 3/2001 | Sullivan et al. |
| 6,241,288 B1 * | 6/2001 | Bergenek et al. ............. 283/67 |
| 6,259,108 B1 | 7/2001 | Antonelli et al. |
| 6,272,562 B1 | 8/2001 | Scott et al. |
| 6,281,931 B1 | 8/2001 | Tsao et al. |
| 6,327,047 B1 | 12/2001 | Motamed |
| 6,330,345 B1 * | 12/2001 | Russo et al. ................. 382/115 |
| 6,347,163 B2 | 2/2002 | Roustaei |
| 6,445,811 B1 * | 9/2002 | Wada ......................... 382/125 |
| 6,658,164 B1 * | 12/2003 | Irving et al. ................. 382/274 |
| 2002/0030668 A1 | 3/2002 | Hoshino et al |

FOREIGN PATENT DOCUMENTS

| | | |
|---|---|---|
| EP | 0 623 890 B1 | 11/1994 |
| EP | 0 623 890 A2 | 11/1994 |
| EP | 0 653 882 A1 | 5/1995 |
| EP | 0 379 333 B1 | 7/1995 |
| EP | 0 785 750 B1 | 7/1997 |
| EP | 0 889 432 A2 | 1/1999 |
| EP | 0 905 646 A1 | 3/1999 |
| EP | 0 924 656 A2 | 6/1999 |
| GB | 2 089 545 A | 6/1992 |
| GB | 2 313 441 A | 11/1997 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 | 8/1999 |
| JP | 11-289421 | 10/1999 |
| WO | WO 87/02491 | 4/1987 |
| WO | WO 90/03620 | 4/1990 |
| WO | WO 92/11608 | 7/1992 |
| WO | WO 94/22371 | 10/1994 |
| WO | WO 96/17480 | 6/1996 |
| WO | WO 97/29477 | 8/1997 |
| WO | WO 97/41528 | 11/1997 |
| WO | WO 98/09246 | 3/1998 |
| WO | WO 98/12670 | 3/1998 |
| WO | WO 99/12123 | 3/1999 |
| WO | WO 99/26187 | 5/1999 |
| WO | WO 99/40535 | 8/1999 |

OTHER PUBLICATIONS

English-language Abstract for Japanese Patent Publication No. 3–161884, published Jul. 11, 1991, printed from espacenet.com, 1 page.

English-language Abstract for Japanese Patent Publication No. 3–194874, published Aug. 26, 1991, printed from espacenet.com, 1 page.

English-language Abstract for Japanese Patent Publication No. 3–194875, published Aug. 26, 1991, printed from espacenet.com, 1 page.

Btt (Biometric Technology Today), Finger technologies contacts, Publisher Sarah Clark, sclark@sjbresearch.com, 2 pages.

Drake, M.D. et al., "Waveguide hologram fingerprint entry device," *Optical Engineering*, vol. 35, No. 9, Sep. 1996, Copyright 1996, Society of Photo–Optical Instrumentation Engineers, pp. 2499–2505.

Roethenbaugh, G. (ed.), *Biometrics Explained*, 1998, ICSA, pp. 1–34.

*Automated Identification Systems* (visited May 20, 1999) <http://www.trw.com/idysystems/bldgaccess2.html>, 1 page, Copyright 1999, TRW Inc.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog. de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index-e. html>, 3 pages, Copyright 1995–1999, Fujitsu Limited.

*SonyCam* (visited May 20, 1999) <http://www.microsoft. com/DDK/ddkdocs/Win2k/sonydcam.htm>, 3 pages, Copyright 1999, Microsoft Corporation.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote (TM)* (visited May 18, 1999) <http://www.pathfinder.com/money/latest/press/PW/1998Mar25/1026.html>, 2 pages.

"Biometrics, The Future Is Now," www.securitymagazine. com, May 1999, pp. 25–26.

*Mytec Technologies Gateway*, (visited Apr. 27, 1999) <http://www.mytec.com/Products/Gateway/>, 1 page.

*Mytec Technologies Gateway: Features & Benefits*, (visited Apr. 27, 1999) <http://www.mytec.com/Products/Gateway/features.htm>, 1 page.

*Mytec Technologies Touchstone Pro*, (visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate. com/index.html>, 1 page, Copyright 1996, Intelnet Inc.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus®  &  Ver–i–Fus$^{mil®}$* (visited May 20, 1999) <http://www.intelgate.com/vif_data.htm>, 3 pages. (Ver–i–fus product released in 1995).
*Access Control System Configurations* (visited May 20, 1999) <http://www.intelgate.com/access.htm>, 2 pages. (Ver–i–fus product released in 1995).
*Company* (visited May 17, 1999) <http://www.instainfo.com/company.htm>, 2 pages.
*TouchLock™ II Fingerprint Identify Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996–1998, Identix Incorporated.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999, Biometric Identification, Inc.
*BII Home Page* (visited Apr. 27, 1999) <http://www.biometricid.com/homepage.htm>, 1 page, Copyright 1999, Biometric Identification, Inc.
*Veriprint 2100 Stand–Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201–203.
*The DERMALOG Check–ID* (visited Nov. 12, 1999) <http://www.dermalog.de/ganzneu/products_check.html>, 1 page.
*Check–ID Specifications and Features* (visited Nov. 12, 1999) <http://www.dermalog.de/ganzneu/spec_check.html>, Copyright 1999, Dermalog Gmbh.
*Startek's Fingerprint Verification Products: FingerFile 1050* visited Oct. 8, 1999) >http://www.startek.com.tw/product/ff1050/ff1050.html>, 3 pages.
*Time is Money!* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs–jena.com/ls1.htm>, 6 pages, Copyright 1998, HBS Gmbh.
*Welcome to the Homepage of Heimann Biometric Systems GMBH* (visited Jun. 4, 1998) <http://www.hbs–jena.com/>, 1 page, Copyright 1998, HBS Gmbh.
*Heimann Biometric Systems Corporate Overview* (visited Jun. 4, 1998) <http://www.hbs–jena.com/company.htm>, 4 pages, Copyright 1998, HBS Gmbh.
*Remote Access Positive IDentification—raPID* (visited Jun. 3, 1998) <http://www.nec.com. . . >, 2 pages, Copyright 1997.
*Morpho DigiScan Cellular* (visited Jun. 3, 1998) <http://www.morpho.com/products/law_enforcement/digiscan/cellular.htm>, 2 pages, Copyright 1998, Sagem Morpho, Inc.
*A.F.I.S.* (last updated Apr. 2, 1998) <http://www.dermalog.de/afis.htm>, 2 pages.
*Morpho FlexScan Workstation* (visited Jun. 3, 1998) <http://www.morpho.com/products/law_enforcement/flexscan/>, 2 pages, Copyright 1998, Sagem Morpho, Inc.
True–ID® The LiveScan with special "ability". . . , 2 pages.
*Printrak International: User List* (visited Jun. 3, 1998) <http://www.printrakinternational.com and links>, 10 pages, Copyright 1996, Printrak International Inc..

*Live–Scan Products: Tenprinter® 1133S* (visited Apr. 23, 1999) <http://www.digitalbiometrics.com/Products/tenprinter.htm>, 4 pages. (Tenprinter 1133S released in 1996).
*TouchPrint™ 600 Live–Scan System* (visited Apr. 23, 1999) <http://www.identix.com/products/livescan.htm>, 4 pages, Copyright 1996–1998, Identix Incorporated.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999, Identix, Inc..
Verid Fingerprint Reader, TSSI, 4 pages.
Response to Request for Information, Cross Match Technologies, Inc., 13 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live–Scan Products: Networking Options* (visited Nov. 17, 1999) <http://www.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/imageprinter.htm>, 2 pages.
*DBI Live–Scan Products: FC–21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).
*Series 500/600 Scanners* (visited Nov. 17, 1999) <http://www.ultra–scan.com/500.htm>, 3 pages. (Scanner released in 1996).
*Series 700 ID Station* (visited Nov. 17, 1999) <http://www.ultra–scan.com/700.htm>, 3 pages. (Scanner released in 1998).
*Identix: The Corporation* (visited Nov. 17, 1999) <http://www.identix.com/corporate/home.htm>, 2 pages, Copyright 1996–1998, Identix Incorporated.
*Biometric Imaging Products* (visited Nov. 17, 1999) <http://www.identix.com/products/bioimage.htm>, 1 page, Copyright 1996–1998, Identix Incorporated.

*TouchPrint™ 600 Live–Scan System* (visited Nov. 17, 1999) <http://www.identix.com/products/livescan.htm>, 4 pages, Copyright 1996–1998, Identix Incorporated.
*TouchPrint™ 600 Palm Scanner* (visited Nov. 17, 1999) <http://www.identix.com/products/palmscan.htm>, 3 pages, Copyright 1996–1998, Identix Incorporated.
*TouchPrint198 600 Card Scan System* (visited Nov. 17, 1999) <http://www.identix.com/products/cardscan.htm>, 3 pages, Copyright 1996–1998, Identix Incorporated.
Dermalog Key—The safest and easiest way of access control (Last updated Jul. 18, 1998) <http://www.dermalog.de/Britain/Products/Key/key.htm>, 1 page.
*Dermalog Finger–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FP-B.html>, 1 page.
*Fingerprint Biometrics: Securing The Next Generation*, May 19, 1999, (visited Nov. 17, 1999) <http://www.secugen.com/pressrel.htm>, 2 pages.
*SecuGen Unveils Fully Functional Fingerprint Recognition Solutions*, May 11, 1999, (visited Nov. 17, 1999) <http://www.secugen.com/pressrel.htm>, 3 pages, Copyright 1999 SecuGen Corporation.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999) <http://www.iosoftware.com/biosols/sony/fiu/applications/fit100.htm>, 2 pages.
*Sony Fingerprint Identification Unit (FIU–700)* (visited Nov. 17, 1999) <http://www.iosoftware.com/biosols/sony/fiu70/index.htm>, 2 pages. (Unit available late 1999).
*Sony Fingerprint Identification Unit* (visited Nov. 17, 1999) <http://www.iosoftware.com/biosols/sony/fiu/index.htm>, 3 pages.
*Fujitsu Fingerprint Recognition Device (FPI–550)* (visited Nov. 17, 1999) <http://www.iosoftware.com/biosols/fujitsu/fpi550.htm>, 2 pages.
*Mitsubishi MyPass LP–1002* (visited Nov. 17, 1999) <http://www.iosoftware.com/biosols/mitsubishi/mypass.htm>, 2 pages.
*SecureTouch PV—A Personal "Password Vault"* (visited Nov. 17, 1999) <http://www.biometricaccess.com/securetouch_pv.htm>, 1 page.
*Digital Descriptor Systems, Inc.–Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/–dg/25.htm>, 3 pages.
*Corporate Profile* (visited Nov. 17, 1999) <http://www.printrakinternational.com/corporte.htm>, 1 page.
*Printrak Products* (visited Nov. 17, 1999) <http://www.printrakinternational.com/Products.htm>, 1 page. (Discusses technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.
*Cross Match Technologies, Inc.* (visited Mar. 25, 1999) <http://www.crossmatch.net/>, 1 page.
*Cross Match Technologies, Inc.—Products Overview* (visited Mar. 25, 1999) <http://www.crossmatch.net/new/products/product–index.html>, 1 page.
*Cross Match Technologies, Inc.—Law Enforcement Systems* (visited Mar. 25, 1999) <http://www.crossmatch.net/new/law/law–index.html>, 2 pages.
*Cross Match Technologies, Inc.—Commercial Systems: Building On The Standard* (visited Mar. 25, 1999) <http://www.crossmatch.net/new/commercial/commercial–index.html>, 2 pages.
*Cross Match Technologies, Inc.—International Sales* (visited Mar. 25, 1999) <http://www.crossmatch.net/new/sales/sales–index.html>, 1 page.
*Cross Match Technologies, Inc.—Support* (visited Mar. 25, 1999) <http://www.crossmatch.net/new/support/support–index.html>, 1 page.
*Cross Match Technologies, Inc.—News—Press Releases—Verifier 400 Press Release* (visited Mar. 25, 1999) <http://www.crossmatch.net/new/news/news–pr–050798.html>, 1 page.
*Global Security Fingerscan™ System Overview* (visited Jan. 11, 2000) <http://wwwu–net.com/mbp/sol/g/a9.htm>, Fujitsu Australia Limited, 1995, Third Edition, 12 pages.
"Command Structure for a Low–Cost (Primitive) Film Scanner," *IBM Technical Disclosure Bulletin*, IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive_fapivl.htm>, 3 pages.
"Image Acquisition System," *IBM Technical Disclosure Bulletin*, IBM Corp., vol. 29, No. 5, Oct. 1986, pp. 1928–1931.
Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.
*Mentalix Provides The First IAFIS–Certified Latent Print Scanning Solution For Windows* (Jul. 23, 1999) <http://www.mentalix.com/pressreleases/fprintlook3_prel.htm>, 2 pages.
Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.
Venot, A. et al., "Automated Comparison of Scintigraphic Images," *Journal of Nuclear Medicine*, vol. 27, No. 8, Aug. 1986, pp. 1337–1342.
EPO Patent Abstract for Japanese Patent Publication No. 59–103474, published Jun. 14, 1984, 1 page.

EPO Patent Abstract for Japanese Patent Publication No. 10–079017, published Mar. 24, 1998, 1 page.

EPO Patent Abstract for Japanese Patent Publication No. 10–262071, published Sep. 29, 1998, 1 page.

EPO Patent Abstract for Japanese Patent Publication No. 11–167630, published Jun. 22, 1999, 1 page.

EPO Patent Abstract for Japanese Patent Publication No. 11–252489, published Sep. 17, 1999, 1 page.

Copy of International Search Report for PCT/US00/35434, mailed May, 7, 2001, 6 pages.

* cited by examiner

FINGERPRINT SCANNER AUTO-CAPTURE SYSTEM AND METHOD

This application claims the benefit of U.S. Provisional Application No. 60/226,092, filed Aug. 18, 2000.

BACKGROUND OF THE INVENTION

1. Field of the Invention

The present invention relates to generally to fingerprint scanning and imaging. More specifically, the present invention relates to a system and method for capturing a fingerprint image.

2. Related Art

Biometrics are a group of technologies that provide a high level of security. Fingerprint capture and recognition is an important biometric technology. Law enforcement, banking, voting, and other industries increasingly rely upon fingerprints as a biometric to recognize or verify identity. See, *Biometrics Explained*, v. 2.0, G. Roethenbaugh, International Computer Society Assn. Carlisle, Pa. 1998, pages 1–34 (incorporated herein by reference in its entirety).

Fingerprint scanners having cameras are available that capture an image of a fingerprint. A signal representative of the captured image is then sent over a data communication interface to a host computer for further processing. For example, the host can perform one-to-one or one-to-many fingerprint matching.

In order to capture a fingerprint image electronically, a light source is typically directed towards a fingerprint capture surface that reflects light from the light source towards a camera. The fingerprint capture surface is generally glass. Contact between the surface of a finger and the fingerprint capture surface causes the reflected light to be representative of the fingerprint of the particular finger placed against the fingerprint capture surface. This reflection then must be captured by camera. The intensity of the reflected light varies greatly in such a system. For example, variations due to manufacturing tolerances and techniques used to produce the light source can affect the intensity of light directed towards the fingerprint capture surface. Such a variation can, however, be determined at the time of manufacture and can be factored into the design of the system. Other variations cannot be determined in advance, and so must be compensated for in the field.

For example, the quality of contact between a finger and the fingerprint capture surface plays a large role in the intensity of the reflected light. A very dry skin surface on a clean fingerprint capture surface may result in a low intensity level of reflected light. On the other hand, an oily skin surface and/or a less-clean fingerprint capture surface may result in a high level of reflected light.

As a result of the above variations, a fingerprint scanner system and method that captures an acceptable fingerprint image is needed. Moreover, in order to produce an effective and simple to use fingerprint scanner, it is desired that such a system and method for capturing an acceptable fingerprint image be implemented with little needed user input.

SUMMARY OF THE INVENTION

A method of capturing an acceptable fingerprint image is disclosed herein. This method includes a step of capturing an initial fingerprint image at a nominal image integration time. Once this initial fingerprint image is captured, a first intermediate fingerprint image at a first intermediate image integration time is captured. Next, an image darkness test is performed followed by an image definition test. If one or more of these tests indicates that the first intermediate fingerprint image is unacceptable, a subsequent intermediate fingerprint image at a subsequent intermediate image integration time is captured. This subsequent intermediate fingerprint image can be captured before the image definition test is performed. Additional intermediate fingerprint images can be captured until an image that has an acceptable darkness level as a well as an acceptable definition level is captured. These additional intermediate fingerprint images can be captured at incremented intermediate integration times.

The intermediate integration times can be derived from the nominal image integration time by multiplying the nominal image integration time by multiples of 1/7 of the nominal image integration time.

A method according to the present invention can include calculating average darkness values for a number of image darkness test lines. Once these image darkness values are calculated, acceptable overall image darkness and acceptable image darkness distribution are verified. Overall image darkness can be verified by calculating average darkness values for a number of image darkness lines arranged in pairs of image darkness lines, the pairs of image darkness lines situated within an expected image capture region. Next, it is verified that a predetermined number of the image darkness test lines have associated calculated average darkness values that exceed a darkness threshold value. The predetermined number can be eight.

Meanwhile, acceptable image darkness distribution can be assessed by determining a ridge count for each of the image definition test lines, and then verifying that image definition is acceptable based on the ridge counts. These ridges counts can be determined for each of a predetermined number, for example five, of vertical image definition test lines and for each of a predetermined number, for example seven, of horizontal image definition test lines.

Also disclosed is a fingerprint scanner for capturing an acceptable fingerprint image that includes a camera that captures an initial fingerprint image at a nominal image integration time and captures a first intermediate fingerprint image at a first intermediate image integration time, as well as a processor that performs an image darkness test and an image definition test. Such a fingerprint scanner can further capture a subsequent intermediate fingerprint image at a subsequent intermediate image integration time when the processor performs an image darkness test that results in an unacceptable darkness level. The fingerprint scanner's camera can continue to capture additional subsequent intermediate integration times until the processor performs an image darkness test that results in an acceptable darkness level. These intermediate integration times can be derived from the nominal integration time in a manner like that used in connection with the method disclosed herein.

The fingerprint scanner's camera continues to capture subsequent intermediate fingerprint images at subsequent intermediate integration times until the processor performs and image darkness test and an image definition test that both result in acceptable image darkness and definition levels, respectively, for a single intermediate fingerprint image, or until a maximum intermediate integration time is reached.

A fingerprint scanner according to the present invention can perform the image darkness and image definition tests described herein.

Further embodiments, features, and advantages of the invention, as well as the structure and operation of the various embodiments of invention, are described in detail below with reference to the accompanying drawings.

DETAILED DESCRIPTION OF THE PREFERRED EMBODIMENTS

Terminology

As used herein, the term "fingerprint scanner" is used to refer to a fingerprint scanner that scans a fingerprint and then processes the image data or transmits the image data to a host processor. Such a fingerprint scanner can be a remote fingerprint scanner where "remote" is meant to imply that the fingerprint scanning can take place at a location physically separate from the host processor. A remote fingerprint scanner and a host processor may be considered physically separate even though they may be connected through a data interface, permanent or otherwise.

As used herein, the term "fingerprint capture event" is used to refer to a single act of capturing a fingerprint image with a fingerprint scanner. This term is not meant to imply any temporal limitations but is instead intended to refer to the event along with the particular characteristics of the event that can change from event to event. Such characteristics include the particular finger and its physical characteristics as well as other factors like the cleanliness of the image capture surface that can affect fingerprint capture.

As used herein, the term "fingerprint image" is used to refer to any type of detected fingerprint image including, but not limited to, an image of all or part of one or more fingerprints, a rolled fingerprint, a flat stationary fingerprint, a palm print, and/or prints of multiple fingers.

As used herein, the term "acceptable fingerprint image" is used to refer to a fingerprint image that has both acceptable darkness as well as acceptable definition. The particular acceptable darkness and definition levels are not critical and can be determined by one skilled in the relevant art given this disclosure, as discussed herein.

Auto-capture System and Method

Figure 1A:
FIGS. 1A, 1B, and 1C are illustrations of three fingerprint images having different light levels.
Figure 1B:
Figure 1C:

FIGS. 1A–1C are illustrations of three fingerprint images having different light levels. The fingerprint image in FIG. 1A is comparatively darker than those of FIGS. 1B and 1C. In a number of places in the fingerprint image of FIG. 1A, adjacent ridges are not discernable since the valleys between such ridges cannot be seen in the image. Such a situation occurs due to over-sensitivity of a camera for a particular reflected image, as will now be described in terms of a fingerprint scanner according to present invention.

Figure 2A:
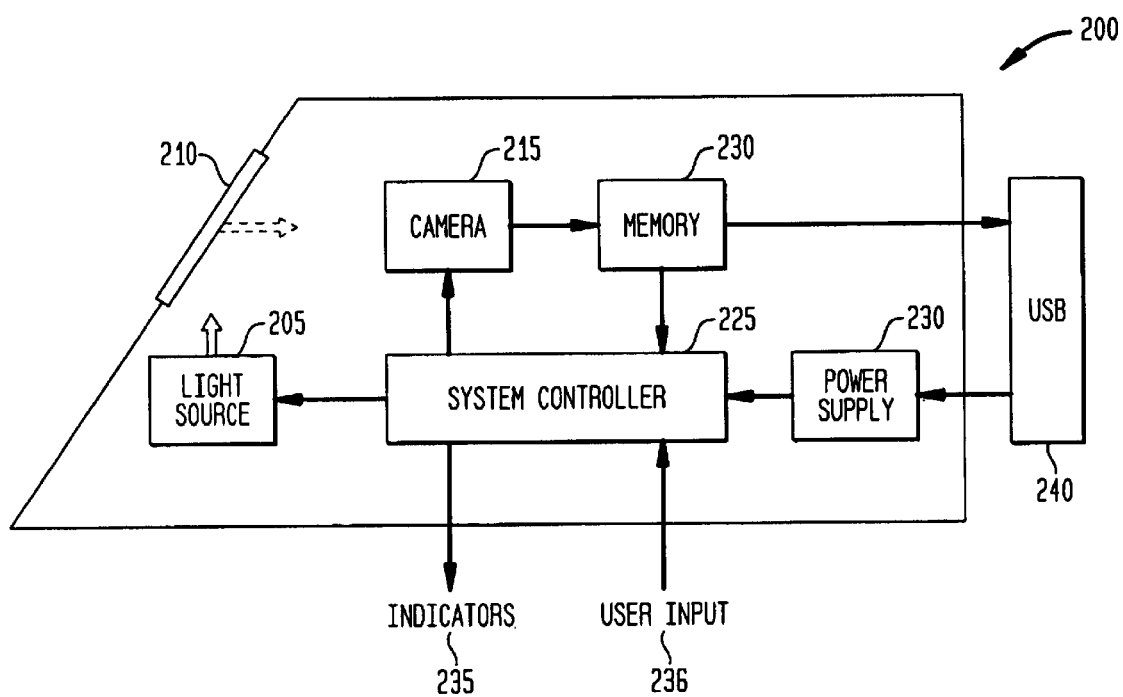
FIG. 2A is an illustration of a fingerprint scanner according to the present invention.

FIG. 2A is an illustration of a fingerprint scanner 200 according to the present invention. Fingerprint scanner 200 includes a light source 205. Light source 205 can be one or more light emitting diodes (LEDs). Alternatively, light source 205 can be another type of light source suitable for use within a fingerprint scanner, as would be apparent to one skilled in the relevant art given this description. Light source 205 directs light toward a fingerprint capture surface 210. Fingerprint capture surface 210 is a transparent or semi-transparent material upon which a finger can be placed so as to cause light from light source 205 to be reflected towards a camera 215. Fingerprint capture surface 210 can be glass, though other materials apparent to one skilled in the relevant art can be used without departing from the scope of the present invention.

As discussed above, the light reflected towards camera 215 by fingerprint capture surface 210 is representative of the contact of a finger with fingerprint capture surface 210. Specifically, contact of ridges on a finger with fingerprint capture surface 210 results in light being reflected in areas corresponding to that contact. Thus, the quality of the contact plays a role in the quantity of reflected light. This contact quality is affected by the dryness of the subject's skin, the cleanliness of the fingerprint contact surface 210, the pressure applied by the subject, and the like. Camera 215 captures the reflected light within, for example, an array of photo-sensitive pixels. The image is then stored in a memory 220. Memory 220 can include both non-volatile and volatile memory. In one example, memory 220 includes non-volatile memory that stores the executable code necessary for device operation and volatile memory for storing data representative of the captured image. Any type of non-volatile memory may be used, for example an electrically-erasable read only memory (EEPROM) or an optically-erasable read only memory (Flash-EPROM), though the invention is not limited to these specific types of non-volatile memory. Volatile memory can be a random-access-memory for storing detected fingerprint images. For example, the image can be stored as an array of values representing a gray-scale value associated with each pixel. Other types of memory (flash memory, floppy drives, disks, mini-floppy drives, etc.) can be used in alternative embodiments of the present invention. Volatile memory can include mini-floppy drives (such as those available from Sandisk Corp. or Intel Corp.). In this way, multiple prints can be stored locally. This is especially important in border control, crime scene, and accident sight applications.

While camera 215 is responsive to light reflected from fingerprint capture surface 210, pixel light intensity is converted into a darkness level so that the stored image is like those appearing in FIGS. 1A–1C. In other words, the actual stored image is represented by dark pixels where light was depicted such that an image of the actual received light pattern would appear as a "negative" of what is shown in FIGS. 1A–1C. Alternatively, the stored image could correspond to actual light levels received, without departing from the scope of the present invention. Camera 215 can include a 1 inch×1 inch array of 500×500 pixels. Other size arrays could also be used, for example a 620×480 pixel array, without departing from the scope of the present invention. Camera 215 can be a CMOS square pixel array. For example, a CMOS camera manufactured by Motorola Corporation can be used. Camera 215 has a sensitivity to light that is controlled by an integration time. The integration time is the length of time the pixels in camera 215 collect light. A longer integration time means more light collected, and thus a brighter (or darker after conversion) image. Before discussing the remaining elements in the fingerprint scanner 200 of FIG. 2, the relationship between integration time and captured image will be discussed in connection with the fingerprint images of FIGS. 1A–1C.

The fingerprint images illustrated in FIGS. 1A–1C illustrate how the quality of a captured fingerprint can be affected by the integration time of the camera. The fingerprint image of FIG. 1A is darker than that of FIG. 1B. This increased darkness can be characterized as an over-sensitivity to light by the capturing camera (keeping in mind that the image received by the camera is the negative of the image shown in the figure). This over-sensitivity can be corrected by shortening the integration time. Thus, by simply shortening the integration time, an image like that of FIG. 1B can be produced for the same fingerprint capture event. The fingerprint image of FIG. 1B is superior in quality to that of FIG. 1A since the shorter integration times results in less saturation of pixels within the camera, while still capturing a high percentage of fingerprint images. Meanwhile, the fingerprint image of FIG. 1C is lighter than that of FIG. 1B. This can be characterized as an under-sensitivity to light by the capturing camera. This under-sensitivity results in the loss of several ridges throughout the captured image in FIG. 1C. As with FIG. 1A, the sensitivity of the capturing camera can be adjusted by changing its integration time. Thus, by lengthening the integration time of the capturing camera, more light can be collected and an image like FIG. 1B can be captured. Thus, FIGS. 1A–1C are representative of fingerprint images captured during a single fingerprint capture event at different integration times.

Two points should be noted about the images of FIGS. 1A–1C. The first is that the differences between the images is meant to illustrate changes in quality and in no way is intended to imply a particular level of quality required before an image is considered "acceptable." In other words, FIG. 1B is meant to illustrate an image with improved quality of images 1A and 1C, but is not meant to illustrate the quality needed to produce an acceptable fingerprint image. Fingerprint image acceptability is determined by particular light levels and ridge count details as can be determined through the darkness and ridge count tests discussed below. Thus, the fingerprint images of FIGS. 1A and 1C might be considered acceptable fingerprint images as that term is used herein. The second point to note is that the images of FIGS. 1A–1C correspond to a particular fingerprint capture event. The integration time corresponding to FIG. 1B could just as easily produce an image like that of FIG. 1A, in a subsequent fingerprint capture event. Since many of the variables that affect the quality of the captured fingerprint image vary between fingerprint capture events, optimal integration time should be determined each time a fingerprint image is captured, as discussed more fully elsewhere herein.

Returning to the fingerprint scanner 200 of FIG. 2A, system controller (also referred to herein as a processor) 225 is also included. System controller 225, using the executable code stored in memory 220, is capable of performing the necessary functions associated with device operation, such as image sensor control in response to user input. System controller 225 also performs the tests associated with capturing an acceptable fingerprint image, as discussed more fully below.

Figure 2B:
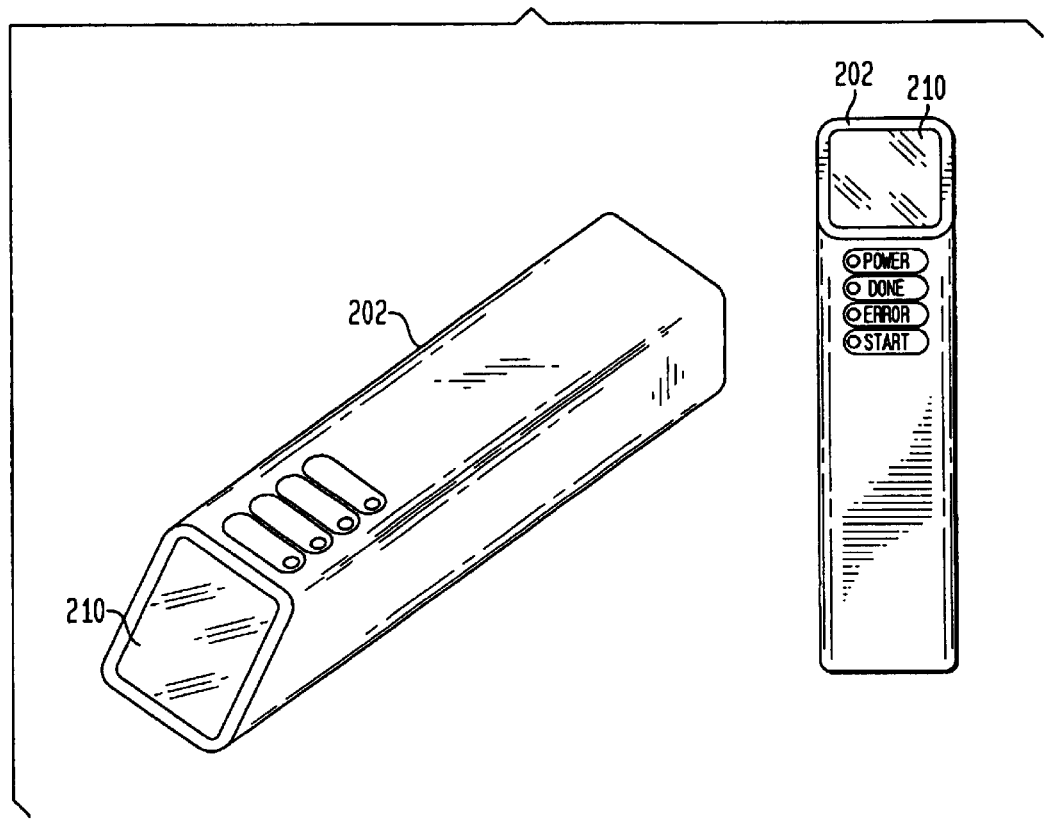
FIGS. 2B and 2C illustrate an example of the outward appearance of a mobile, hand-held remote fingerprint scanner according to FIG. 2A

As would be apparent to a person skilled in the art, other types of memory, circuitry and/or processing capability may be included within fingerprint scanner 200, examples of which include a frame grabber and an analog/digital converter. Also included in the fingerprint scanner 200 shown in FIG. 2 is a power supply 230, a Universal Serial Bus (USB) interface 240, indicators 235, and user input controls 236 (the latter two shown as indicators and buttons in FIG. 2B). While a USB interface is used in connection with the preferred embodiments, the invention is not limited to such an interface. Any communications interface can be used. For example, an IEEE 1394 High Performance Serial Bus interface, RF interface, or even a proprietary interface may be used without departing from the scope of the present invention.

Figure 2C:
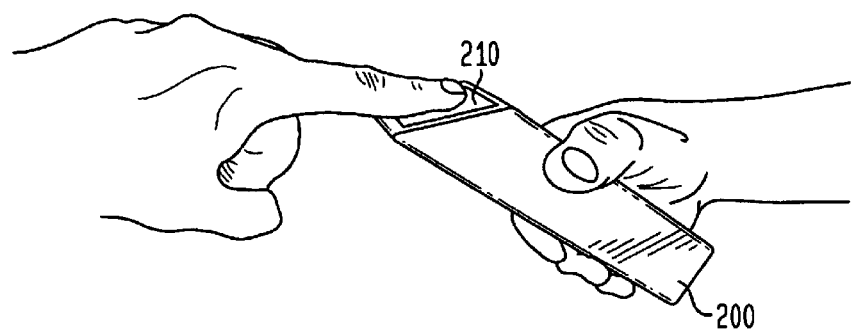

FIGS. 2B and 2C illustrate an example of the outward appearance of a mobile, hand-held remote fingerprint scanner according to FIG. 2A. Fingerprint scanner 202 is ergonomically designed to fit the hand naturally. The oblong, cylindrical shape (similar to a flashlight), does not contain sharp edges. The device is small enough to be gripped by large or small hands without awkward or unnatural movement. The device is comfortable to use without muscle strain on the operator or subject. In one example, fingerprint scanner 202 is 1.5×8.0×1.5 inches (height×length×width), weighs about 340 grams (12 oz.), and has an image capture surface 210 size of about 1"×1".

Fingerprint scanner 202 has controls and status indicators on the front-face of the unit for single (left or right) hand operation. The non-intimidating appearance of the fingerprint scanner 202 is designed to resemble a typical flashlight—a device that is not generally threatening to the public. Fingerprint scanner 202 has no sharp edges and is constructed of a light-weight aluminum housing that is coated with a polymer to give the device a "rubberized" feel. Because fingerprint scanner 202 is small and lightweight, it may be carried on the officer's utility belt upon exiting a vehicle. The device is designed for one hand use, allowing the officer to have a free hand for protective actions. Fingerprint scanner 202 is designed for harsh environments to sustain issues such as dramatic temperature changes and non-intentional abuse.

Fingerprint scanner 202 contains a simple push button and set of 3 LED's that provide user activation and status indication. The user need only press one button to activate the unit. Once activated, the fingerprint scanner 202 awaits a finger to be introduced to the fingerprint capture surface. The digital (or analog) image is automatically captured when an acceptable image is detected. The image is then tested for quality of data prior to notifying the operator with an indication (e.g., visual indication and/or audible tone) for acceptance. A routine for automatically capturing an acceptable fingerprint image can be performed in accordance with the present invention, as is discussed elsewhere herein. The unit emits a tone to indicate a completed process. The officer may introduce the unit to a docking station blindly, maintaining his eyes on the subject for safety. Once seated in the docking station, the fingerprint is automatically transferred to the mobile computer without operator intervention. The detected image is scalable to conform to FBI provided software (cropped or padded to 512 pixels by 512 pixels), although the standard image size is 1"×1", 500 dpi, 256 levels of gray-scale (ANSI-NIST). Other details of fingerprint scanner 202 can be found in co-pending U.S. patent application Ser. No. 09/430,296, entitled Hand-Held Fingerprint Scanner With On-Board Image Normalization Data Storage, filed Oct. 29, 1999 (attorney docket no. 1823.0100000), hereby incorporated by reference in its entirety.

Fingerprint scanner 202 is held in either hand and used to capture a person's fingerprint. The fingerprint is captured from a cooperative individual (frontal approach) or an uncooperative individual (handcuffed subject—most commonly face down). Fingerprint scanner 202 can be operated with one-hand, allowing the officer to have a hand ready for protective actions. The officer need not have fingerprinting knowledge to capture the fingerprint.

As discussed above, the integration time of camera 215 within fingerprint scanner 200 can be adjusted to compensate for light level changes introduced by variations in the contact quality between a finger and the fingerprint capture surface during any particular fingerprint capture event. Such compensation can be done automatically, i.e. without operator input, within the fingerprint scanner 200 according to a method that will next be described.

Figure 3:
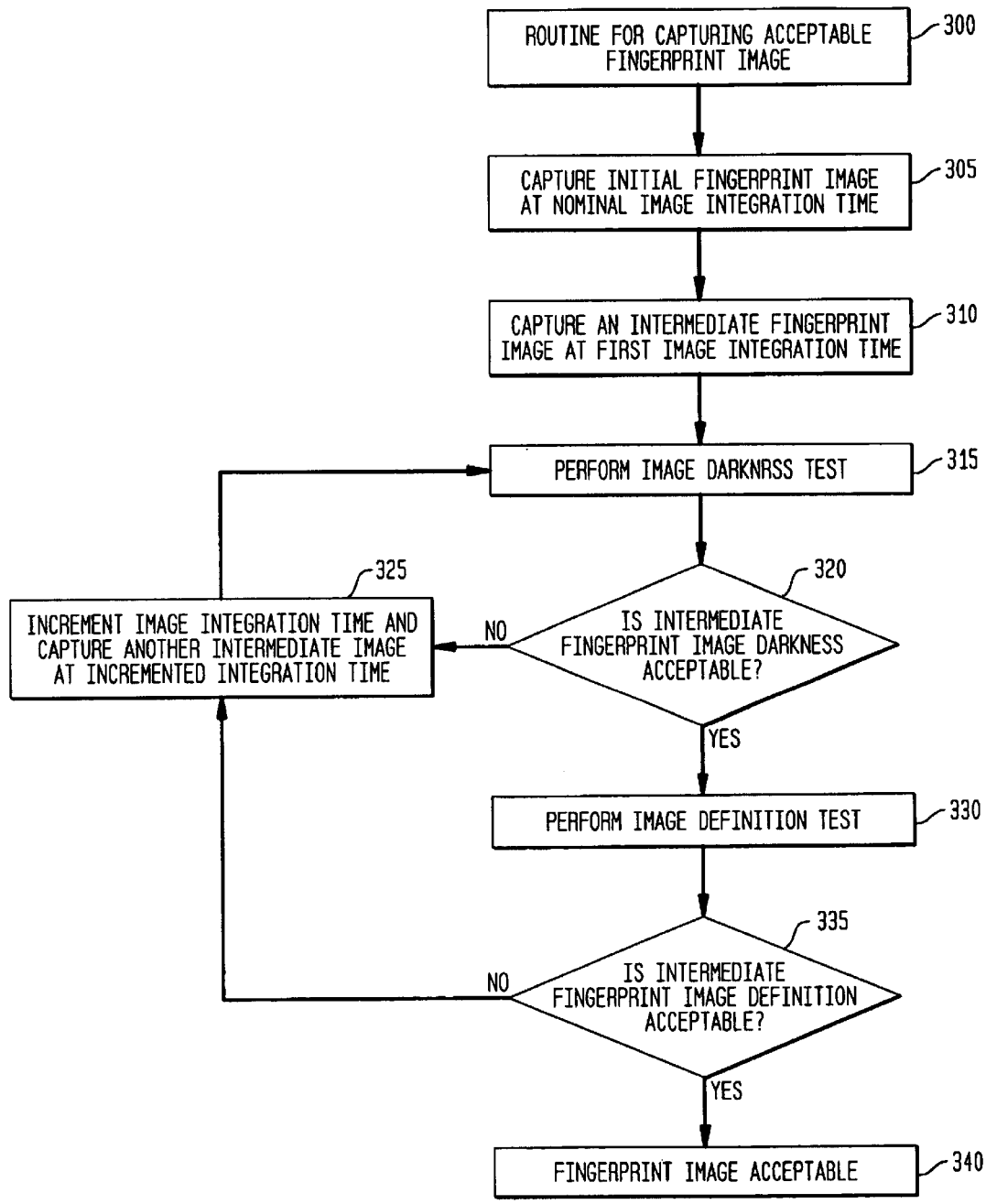
FIG. 3 is an illustration of a routine for capturing an acceptable fingerprint image according to an embodiment of the present invention.

FIG. 3 is an illustration of a routine 300 for capturing an acceptable fingerprint image according to an embodiment of the present invention. In a first step 305 an initial fingerprint image is captured at a nominal integration time. In the first step 305, the fingerprint scanner is "waiting" for the presence of a finger. Thus, the first step 305 involves the fingerprint scanner continually capturing images at the nominal integration time until the presence of a finger is detected. The presence of a finger is detected by performing a darkness test after each image is captured at the nominal integration time. Once the result of a darkness test is positive, meaning a fingerprint image with sufficient darkness has been detected, an initial fingerprint image has been captured, thus completing the first step 305. The darkness test used can be a darkness test according to the present invention, described below more fully in connection with FIGS. 4A and 4B. The nominal integration time can be an integration time expected to a capture an acceptable fingerprint image based on the intensity of the light source used and the sensitivity of the camera, discounting any variations due to the quality of the contact between the finger and fingerprint capture surface. Typically, there is a range of integration times associated with a given camera, for example from 20–120 milliseconds. The nominal integration time can thus be determined based on expected conditions in advance as a particular integration time from within the typical range for a given camera. For example, a typical nominal integration time can be 50 ms, though other nominal integration times could be chosen without departing from the scope of the present invention. For example, a nominal integration time from within the range of 40 ms to 60 ms could be selected for a camera with an integration time range of 20–120 ms.

In a next step 310 of the routine 300 shown in FIG. 3, an intermediate fingerprint image is captured at a first integration time. The present invention uses a set of integration times to find an optimal integration time once an initial fingerprint image is captured at the nominal integration time. The set of integration times can be derived from the nominal integration time. For example, the set of integration times can include six integration times that are each equal to the nominal integration time multiplied by an appropriate scaling factor. In an embodiment, the integration times can be equal to 6/7, 7/7, 8/7, 9/7, 10/7, and 11/7 multiplied by the nominal integration time. Thus, if the nominal integration time is selected to be 50 ms, the integration times used in a routine according to an embodiment of the present invention would be: 43 ms, 50 ms, 57 ms, 64 ms, 71 ms, and 79 ms. Thus, continuing with this example, once the initial image is captured at 50 ms, the integration time is shortened to 43 ms and an intermediate fingerprint image is captured. As will be discussed below, additional intermediate fingerprint images can be captured at higher integration times until an acceptable fingerprint image is captured. It should thus be apparent to one skilled in the relevant art that the particular integration times used are not critical, so long as a range of integration times around the nominal integration time is used.

In a next step 315 of the routine 300 of FIG. 3, an image darkness test of the intermediate image captured in step 310 is performed. Such an image darkness test is used to determine whether the intermediate image is sufficiently dark. An image darkness test of the present invention, as discussed below in connection with FIGS. 4A and 4B, can be used. Other image darkness tests could also be used without departing from the scope of the present invention. For example, simply averaging the values of all the pixels in the camera can give an indication of the darkness level of the captured intermediate image.

Depending on the outcome of the image darkness test performed in step 315, a next step 325 or 330 is performed as shown in FIG. 3 at 320. The particular level of darkness required for an acceptable darkness level is not critical and could be determined by one skilled in the relevant art given this disclosure. The acceptable darkness level can be environment and use specific and thus can be set by the manufacturer or user, as appropriate.

If the image darkness test of step 315 results in an un-acceptable darkness level, then a next step 325 of incrementing the image integration time and capturing another intermediate image at the incremented integration time is performed. The only exception to this step is when the integration time cannot be incremented to a higher integration time because the highest integration is the one at which the intermediate fingerprint image was captured. In such a case, the routine returns to step 305.

If the image integration time has been incremented and another intermediate image captured, the routine returns to step 315 to perform the darkness test again. Thus, routine 300 includes a loop with steps 315, 320, and 325 repeating until an intermediate image with an acceptable darkness level has been captured.

Once an intermediate fingerprint image with an acceptable darkness level has been captured, an image definition test is performed at a step 330. The image definition test used can be an image definition test according to the present invention and discussed below in connection with FIGS. 5A and 5B. Such an image definition test counts the number of ridges in predefined areas by focusing on pixel patterns that include minimum numbers of consecutive light and dark pixels generally representative of the presence of the ridges and valleys characteristic of a fingerprint image. Alternatively, any image definition test that tests the captured image for its level of detail can be used without departing from the scope of the present invention. The particular level of image definition required for an acceptable image definition level is not critical and could be determined by one skilled in the relevant art given this disclosure. The acceptable image definition level can be environment and use specific and thus can be set by the manufacturer or user, as appropriate.

Once the image definition test has been performed in step 330, one of two different steps are conducted based on the outcome of that test as shown at 335.

If the image definition test 330 indicated that the intermediate fingerprint was of unacceptable definition, then the routine returns to step 325, discussed above. As with the above description of step 325, if the integration time cannot be incremented because the captured image was a result of the maximum integration time, routine 300 returns to step 305 to await a new initial fingerprint image.

If the image definition test 330 indicated that the intermediate fingerprint image was of acceptable definition, then intermediate finger print image is an acceptable fingerprint image in terms of both darkness as well as definition. Thus, in a final step 340, the intermediate fingerprint image that has passed both tests is an acceptable fingerprint image and the routine is complete. In this way, routine 300 has automatically captured an acceptable fingerprint image. Step 340 can include a step of providing a signal that an acceptable fingerprint image has been captured. This signal can be audible, visible, or both.

Details of an image darkness test and an image definition test in accordance of the present invention will now be described in terms of FIGS. 4A, 4B, 5A, and 5B.

Figure 4A:
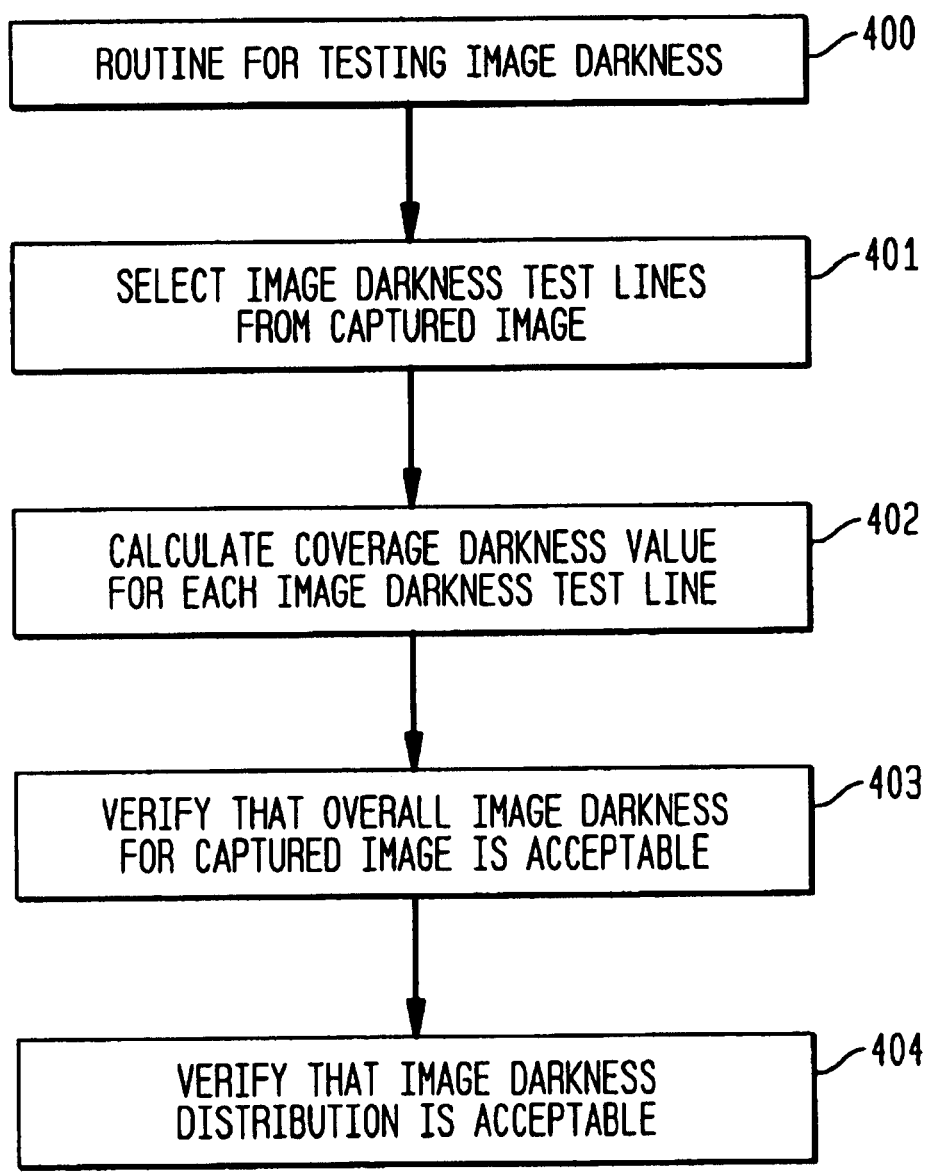
FIG. 4A illustrates a routine for testing image darkness 400 in accordance with the present invention.

FIG. 4A illustrates a routine for testing image darkness 400 in accordance with the present invention. In a first step 401 of routine 400, image darkness test lines are selected from a captured image. Thus, rather than observing pixels from the entire image to determine darkness, only a few lines of pixels are selected.

Figure 4B:
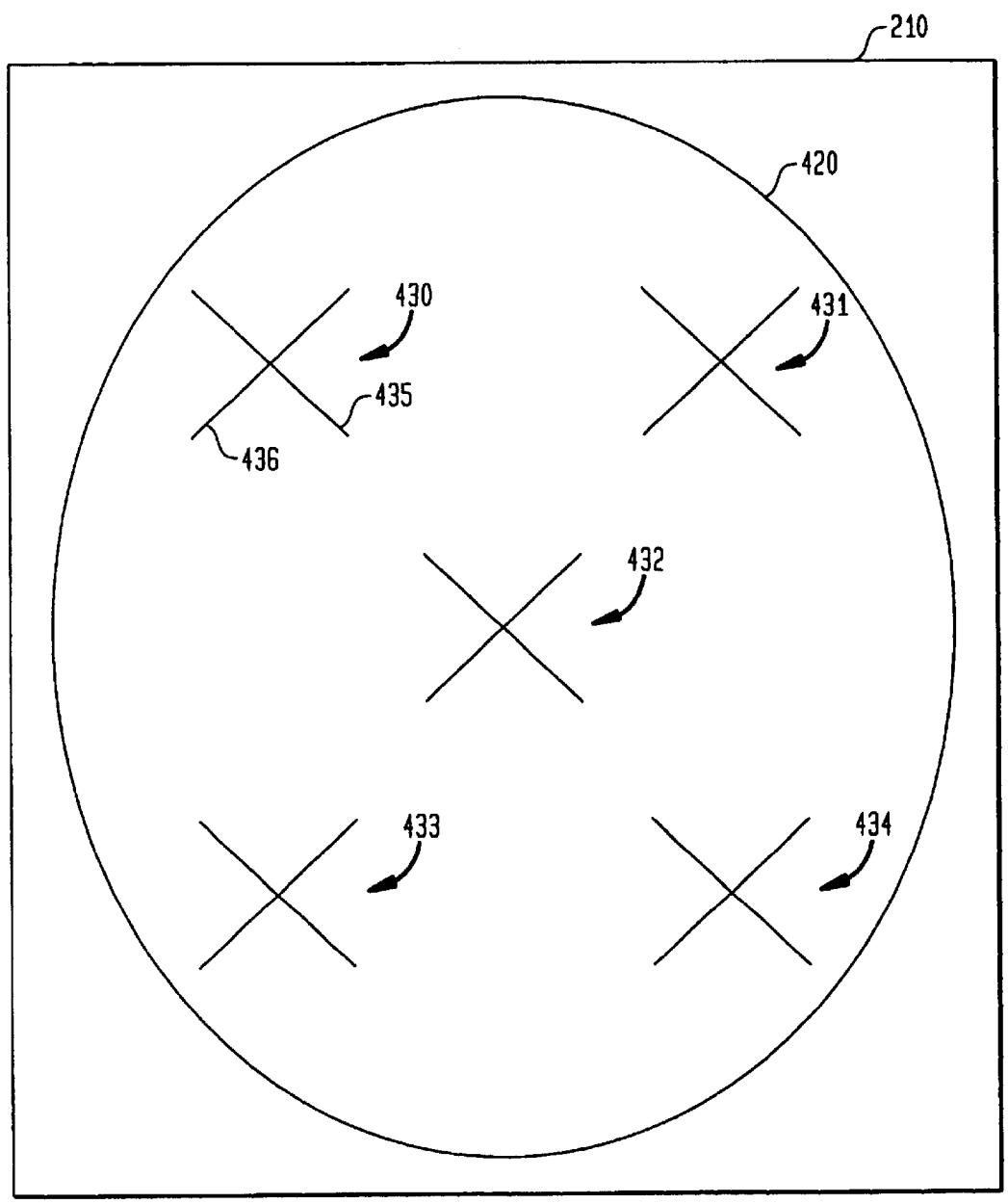
FIG. 4B illustrates an arrangement of image test lines used in an image darkness test according to the present invention.

The present inventor has discovered that by selecting particular test lines, the image darkness test can not only ensure adequate image darkness from testing only a handful of lines, but can also ensure proper fingerprint placement on the image capture surface of a fingerprint scanner. FIG. 4B shows the details of such image test lines according to one example.

FIG. 4B illustrates an arrangement of image darkness test lines used in an image darkness test according to the present invention. In FIG. 4B, image capture surface 210 is depicted with an expected image capture area 420. Expected image capture area 420 is a region in which a fingerprint is expected to be located during an image capture event. The precise size and location of image capture area 420 can differ from that shown in the figure without departing from the scope of the invention. In order to ensure that the dark areas present during a darkness test are arranged in an expected area, image test lines are situated throughout expected image capture area 420. Specifically, in the arrangement of FIG. 4B, there are ten image test lines 435, 436, and the like. These ten image test lines are arranged in five pairs of image test lines 430–434. These five pairs of image test lines 430–434 are spaced throughout the expected image capture area 420 as shown in FIG. 4B. In an embodiment of the invention, each image test line 435, 436, is a diagonal arrangement of 32 pixels. Other numbers of pixels and arrangements of image test lines could be used without departing from the scope of the invention.

In a next step 402 of the routine 400 shown in FIG. 4A, an average darkness value for each image darkness test line is calculated. Such an average can be calculated by adding the darkness value for each pixel in an image darkness test line and then dividing that sum by the number of pixels in the image darkness test line.

In a next step 403, acceptable overall image darkness is verified. This verification can be done, for example, by verifying that a predetermined number of image darkness test lines have an associated average image darkness level above a threshold darkness level. In an embodiment, the predetermined number (or percentage) of image darkness test lines is eight (or 80% of the image darkness test lines). If eight image darkness test lines have an average image darkness level above the threshold darkness level, the overall image darkness is considered acceptable. Other numbers (or percentages) of image darkness lines can be used without departing from the scope of the present invention. Likewise, the particular threshold darkness level chosen is not critical and could be determined by one skilled in the relevant art given this disclosure. The acceptable darkness level can be based on the specific environment in which the fingerprint scanner is used as well as requirements associated with the field in which the fingerprint scanner is used and thus can be set by the manufacturer or user, as appropriate.

Once overall image darkness has been verified as acceptable in step 403, a next step 404 of verifying acceptability of image darkness distribution is performed. It should be noted that if the previous step 403 resulted in a determination that overall image darkness was not acceptable for the tested image, it is not necessary that routine 400 continue, but could instead stop at step 403. In step 404, image darkness distribution is tested. Despite the determination in step 403 that overall image darkness was acceptable, this darkness may have been concentrated in a particular region. For example, if all image darkness test lines in pairs 430–433, as shown in FIG. 4B, have acceptable darkness levels, the image will have an acceptable overall image darkness despite a lack of acceptable darkness in both image darkness test lines in pair 434. Thus, step 404 is used to verify that the darkness of the image is distributed throughout the expected image capture area 420. The step can be performed by verifying that at least one image darkness test line in each of the five pairs 430–434 of image darkness test lines has an acceptable darkness level. As with step 403, this can be done by comparing the average darkness value of each darkness test line with a predetermined threshold darkness value. This threshold darkness value can be the same value used in connection with step 403. Likewise, as with step 403, the particular threshold darkness level chosen is not critical and could be determined by one skilled in the relevant art given this disclosure. The acceptable darkness level can be based on the specific environment in which the fingerprint scanner is used as well as requirements associated with the field in which the fingerprint scanner is used and thus can be set by the manufacturer or user, as appropriate.

Because step 404 of the routine 400 shown in FIG. 4A verifies that the image darkness is distributed throughout expected image capture region 420, the routine 400 of FIG. 4A can be used to verify acceptable darkness level throughout a particular region. Accordingly, such a routine 400 can be used as the image darkness test within the routine 300 shown in FIG. 3. Meanwhile, the image definition test 330 also shown in routine 300 can be performed with a routine like that shown in FIG. 5A.

Figure 5A:
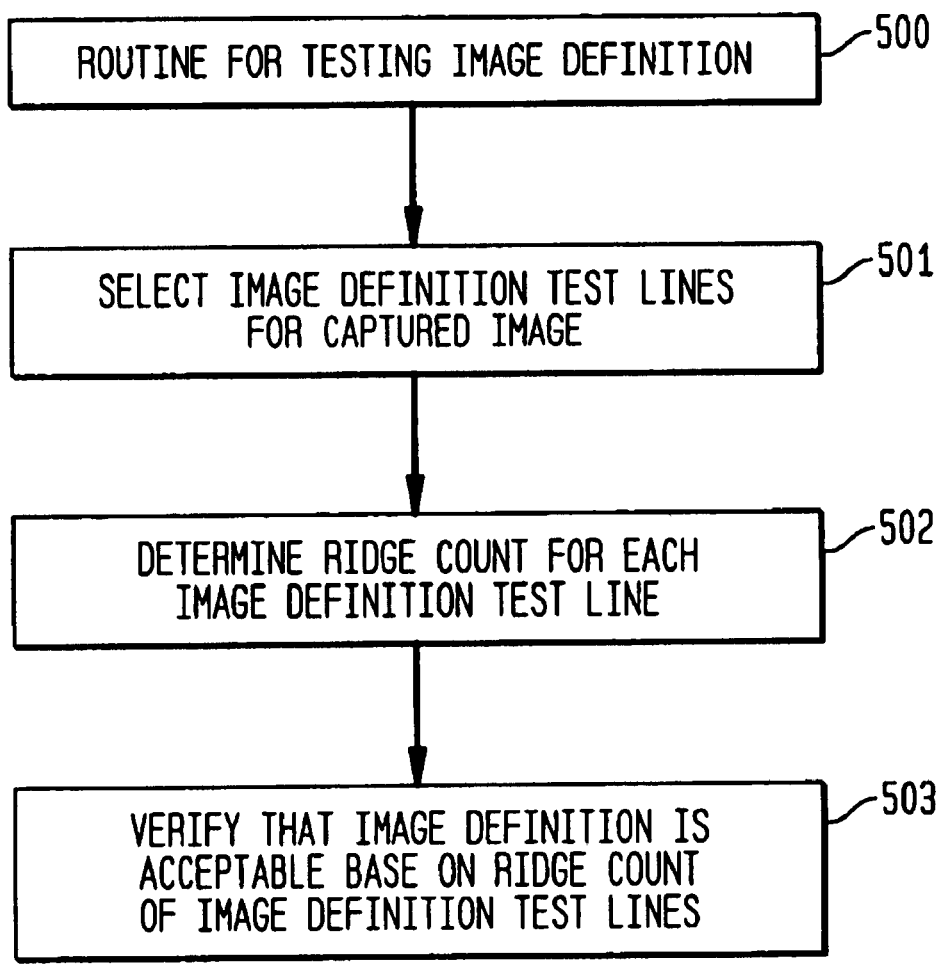
FIG. 5A is an illustration of a routine for testing image definition in accordance with the present invention.

FIG. 5A is an illustration of a routine for testing image definition 500 in accordance with an embodiment of the present invention. While the routine 400 of FIG. 4A tested an image for an acceptable darkness level, the routine 500 of FIG. 5A tests an image for an acceptable level of definition. Such a test is useful because, for example, a particular image may be have an acceptable level of darkness while lacking the necessary ridge details characteristic of an acceptable fingerprint image. Thus, routine 500 tests an image for its definition level. Since a fingerprint image should have the dark ridges separated by light valleys characteristic of an acceptable fingerprint image, routine 500 tests for image definition by counting ridges and valleys along image definition test lines. In a first step 501 of the routine 500 of FIG. 5A, image definition test lines are selected from a captured image to be tested. This will be explained in connection with FIG. 5B.

Figure 5B:
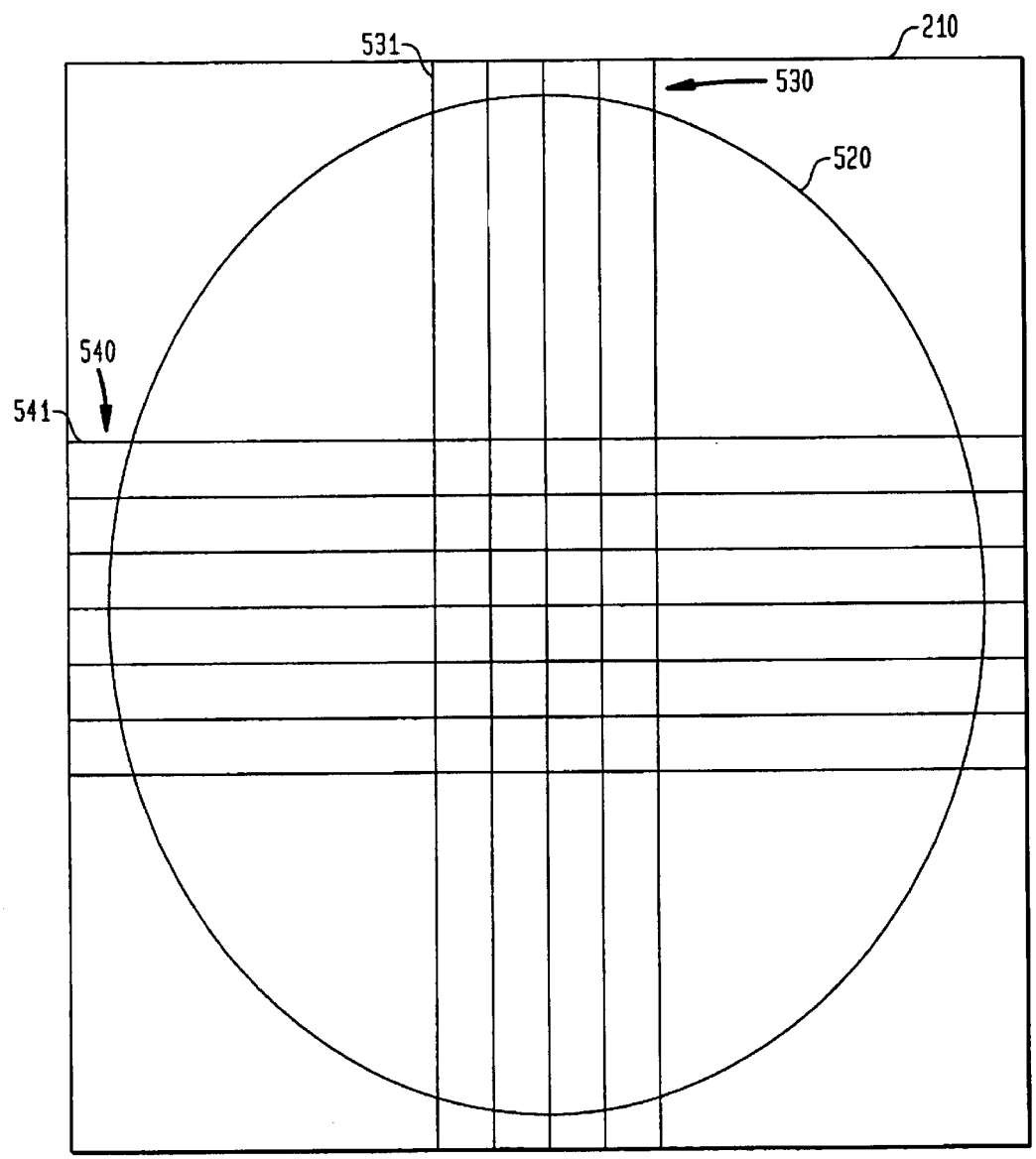
FIG. 5B illustrates an arrangement of image definition test lines used in an image definition test according to the present invention.

FIG. 5B illustrates an arrangement of image definition test lines used in an image definition test according to the present invention. In FIG. 5B, image capture surface 210 is depicted with an expected image capture area 520. As with the arrangement shown in FIG. 4B, expected image capture area 520 is a region in which a fingerprint is expected to be located during an image capture event. The precise size and location of image capture area 520 can differ from that shown in the figure without departing from the scope of the invention. Within the image capture area 520 are arranged two groups 530, 540 of image definition test lines 531, 541, and the like. Each image definition test line is a line of pixels within the image capture area 520. The first group of image definition test lines 530 includes five vertically arranged parallel image definition test lines, e.g. 531. The second group of image definition test lines 540 includes seven horizontally arranged parallel image definition test lines, e.g. 541. While specific numbers of image definition test lines have been depicted, other numbers of image definition test lines could be used without departing from the scope of the present invention. Likewise, while the arrangement of image definition test lines has been selected in the arrangement of FIG. 5B to include more horizontally arranged lines than vertically arranged lines, different arrangements could be used without departing from the scope of the present invention.

In a next step 502 of the routine 500 shown in FIG. 5A, a ridge count for each image definition test line is determined. Such a ridge count can be determined by looking for a pattern of pixel undulations representative of an expected pattern of fingerprint ridges. In a fingerprint image, ridges are shown as adjacent dark areas separated from each other by intervening light areas representative of valleys. Thus, a line of pixels that includes a number of fingerprint ridges will include a substantially continuous group of comparatively dark pixels following by a substantially continuous group of comparatively light pixels. Whether a pixel is considered comparatively dark or light can be determined by selecting a mid-range light level. This mid-range light level can be a single light level or a range of light levels. A comparatively dark pixel is one that is on the dark side of this mid-range light level while a comparatively light pixel is one that is on the light side of this mid-range light level. Thus, a ridge can be determined by the presence of, for example, three or more continuous comparatively dark pixels bounded by, for example, three or more comparatively light pixels. In this way, the number of ridges within one image definition test line can be determined in step 502 by counting groups of comparatively dark pixels separated by groups of comparatively light pixels. The actual number of comparatively dark pixels necessary to define to a ridge could be determined by one skilled in the relevant arts given this disclosure.

In a final step 503, the ridge counts of the image definition test lines determined in step 502 are used to verify image definition acceptability. This can be done, for example, by verifying that the ridge count for each image definition test line is greater than a threshold ridge count value associated with each image definition test line. The particular threshold ridge count values used are not critical and could be determined by one skilled in the relevant art given this disclosure. Rather than having a threshold ridge count value for each image definition test line, a singe threshold ridge count value could be used for all the image definition test lines. As with acceptable image darkness, the acceptable image definition level can be based on the specific environment in which the fingerprint scanner is used as well as requirements associated with the field in which the fingerprint scanner is used and thus can be set by the manufacturer or user, as appropriate.

Companding Curves

Figure 6:
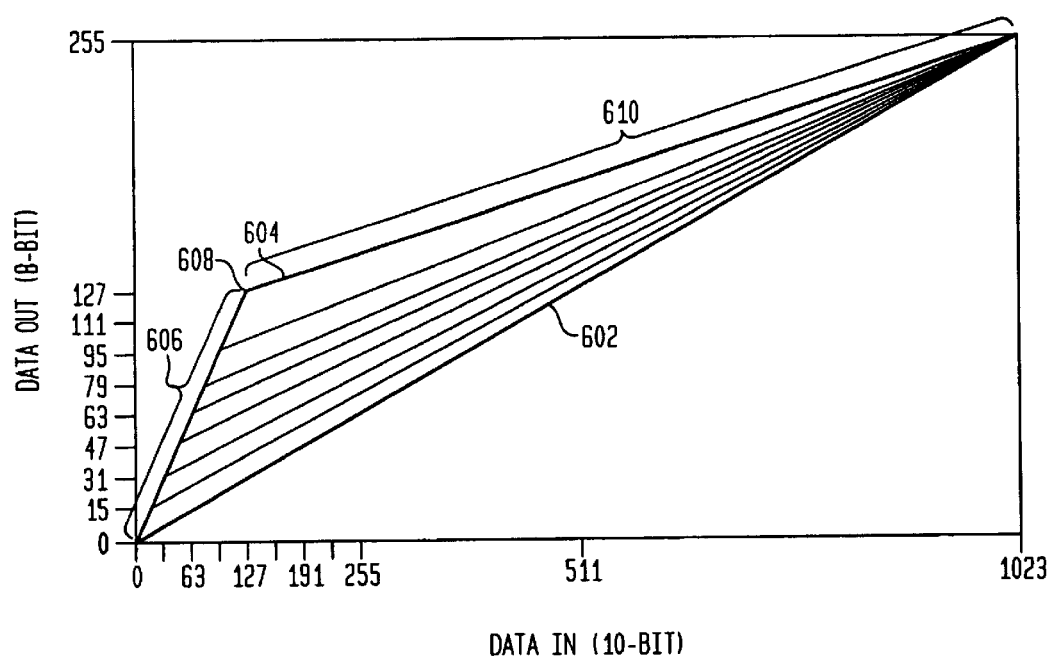
FIG. 6 shows a range of example companding curves.

In an embodiment, darkness level may be further changed based on a camera setting. The camera setting can be varied to adjust the integration time over a range of piecewise linear functions. The camera includes a set of look up tables that define the set of piecewise linear functions. For example, the set of piecewise linear functions may be companding curves, as used in a Motorola camera model number SCM20014. Companding curves allow for coring of lower order bits of captured image data. In effect, companding curves expand the value of lower signal levels, and compress higher signal levels, allowing for on-chip contrast adjustments. Furthermore, a companding function may perform data transformations, such as performing an 8-bit transformation on an incoming 10-bit data stream. FIG. 6 shows a range of example companding curves, that provide for an 10-bit to 8-bit transformation.

For example, as shown in FIG. 6, a first companding curve 602 may be linear, in which the output is divided by four. A second companding curve 604, has a first portion 606 that maintains a 1:1 I/O relationship up to a breakpoint 608. For a second portion 610 after breakpoint 608, a straight line equation may be used to transform the remaining input values. Any number of companding curve configurations are applicable to the present invention.

According to the present embodiment, one or more of steps 305 through 335 are performed on a first companding curve. The same steps are then performed on a second companding curve. This routine is repeated until the desired set of steps has been performed on all desired companding curves. For example, steps 305, 310, 315, 320, and 325 may be performed on all desired companding curves. Alternatively, steps 305, 310, 315, 320, 325, 330, 335 may be performed on all desired companding curves.

A user may select the set of companding curves to be used in a particular fingerprint image capturing system application, or a set of companding curves may be determined automatically, such as by a computer system. In this way, an acceptable fingerprint image is captured, having an image integration time and a companding curve selected to capture an optimum acceptable fingerprint image.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of capturing an acceptable fingerprint image comprising the steps of:

(a) capturing an initial fingerprint image at a nominal image integration time;

(b) capturing a first intermediate fingerprint image at a first intermediate image integration time;

(c) performing a fingerprint image darkness test, including calculating average darkness values for a plurality of image darkness lines arranged in pairs of image darkness lines, said pairs of image darkness lines situated within an expected image capture region; and (d) performing an image definition test.

2. The method of claim 1, further comprising a step (e) of capturing a subsequent intermediate fingerprint image at a subsequent intermediate image integration time prior to said step (d) when said step (c) results in an unacceptable darkness level.

3. The method of claim 2, further comprising repeating said step (e) at additional subsequent intermediate integration times until said step (c) results in an acceptable darkness level.

4. The method of claim 3, wherein said intermediate integration times are within a range of times that includes said nominal image integration time.

5. The method of claim 4, wherein said intermediate integration times comprise multiples of 1/7 of the nominal image integration time.

6. The method of claim 2, further comprising repeating said steps (b), (c), (d), and (e) until said step (d) results in an acceptable image definition level.

7. The method of claim 1, wherein said step (c) further comprises the steps of:
(f) calculating average darkness values for a plurality of image darkness test lines;
(g) verifying that overall image darkness is acceptable; and
(h) verifying that image darkness distribution is acceptable.

8. The method of claim 1, wherein said step (g) further comprises verifying that a predetermined number of said plurality of image darkness test lines have associated calculated average darkness values that exceed a darkness threshold value.

9. The method of claim 8, wherein said step (g) further comprises verifying that eight of said plurality of image darkness test lines have associated calculated average darkness values that exceed a darkness threshold value, and wherein said plurality of image darkness test lines includes ten image darkness test lines.

10. The method of claim 1, wherein said step (d) further comprises the steps of:
(i) determining a ridge count for each of a plurality of image definition test lines; and
(j) verifying that image definition is acceptable based on the ridge counts determined in said step (i).

11. The method of claim 10, wherein said step (i) further comprises determining a ridge count for each of a predetermined number of a first set of image definition test lines and for each of a predetermined number of a second set of image definition test lines.

12. The method of claim 11, wherein said first set of image definition test lines comprises five vertical image definition test lines and said second set of image definition test lines comprises seven horizontal image definition test lines, and wherein said step (i) further comprises determining a ridge count for each of said five vertical image definition test lines and for each of said seven of horizontal image definition test lines.

13. The method of claim 1, further comprising the step of:
(e) performing said step (c) after a first companding curve is applied to the fingerprint images.

14. The method of claim 13, further comprising the step of:
(f) performing the following steps when said step (c) results in an unacceptable darkness level:
(i) repeating steps (a) and (b);
(ii) applying a subsequent companding curve to the fingerprint images captured in step (i); and
(iii) repeating step (c).

15. The method of claim 14, further comprising the step of:
repeating said step (f) until said step (c) results in an acceptable darkness level.

16. The method of claim 1, wherein the plurality of image darkness lines arranged in pairs includes a first pair of image darkness test lines, the first pair including a first image darkness test line and a second image darkness test line, wherein the first image darkness test line intersects with the second image darkness test line, wherein step (c) comprises:
calculating average darkness values for the first image darkness test line and the second image darkness test line.

17. A fingerprint scanner for capturing an acceptable fingerprint image comprising:
a camera that captures an initial fingerprint image at a nominal image integration time and captures a first intermediate fingerprint image at a first intermediate image integration time; and
a processor that performs an image darkness test and an image definition test;
wherein said processor calculates average darkness values for a plurality of image darkness lines arranged in pairs of image darkness lines, said pairs of image darkness lines situated within an expected image capture region.

18. The fingerprint scanner of claim 17, wherein said camera further captures a subsequent intermediate fingerprint image at a subsequent intermediate image integration time when said processor performs an image darkness test that results in an unacceptable darkness level.

19. The fingerprint scanner of claim 18, wherein said camera captures additional subsequent intermediate integration times until said processor performs an image darkness test that results in an acceptable darkness level.

20. The fingerprint scanner of claim 19, wherein said intermediate integration times are derived from said nominal image integration time.

21. The fingerprint scanner of claim 20, wherein said intermediate integration times are derived from said nominal image integration time by multiplying said nominal image integration time by multiples of 1/7 of the nominal image integration time.

22. The fingerprint scanner of claim 18, wherein said camera captures subsequent intermediate fingerprint images at subsequent intermediate integration times until said processor performs and image darkness test and an image definition test that both result in acceptable image darkness and definition levels, respectively, for a single intermediate fingerprint image.

23. The fingerprint scanner of claim 17, wherein said processor calculates average darkness values for a plurality of image darkness test lines, verifies that overall image darkness is acceptable, and verifies that image darkness distribution is acceptable.

24. The fingerprint scanner of claim 17 wherein said processor verifies that a predetermined number of said plurality of image darkness test lines have associated calculated average darkness values that exceed a darkness threshold value.

25. The fingerprint scanner of claim 24, wherein said processor verifies that eight of said plurality of image darkness test lines have associated calculated average darkness values that exceed a darkness threshold value, and wherein said plurality of image darkness test lines includes ten image darkness test lines.

26. The fingerprint scanner of claim 17, wherein said processor determines a ridge count for each of a plurality of image definition test lines and verifies that image definition is acceptable based on the ridge count for each of the plurality of image definition test lines.

27. The fingerprint scanner of claim 26, wherein said processor determines a ridge count for each of a predetermined number of vertical image definition test lines and for each of a predetermined number of horizontal image definition test lines.

28. The fingerprint scanner of claim 27, wherein said processor determines a ridge count for each of five vertical image definition test lines and for each of seven of horizontal image definition test lines.

29. The fingerprint scanner of claim 17, wherein said camera applies a first companding curve to said captured fingerprint images prior to said image darkness test.

30. The fingerprint scanner of claim 29, wherein said camera captures an subsequent initial fingerprint image at a nominal image integration time and captures a subsequent first intermediate fingerprint image at a first intermediate image integration time when said image darkness test results in an unacceptable darkness level;
    wherein said camera applies a subsequent companding curve to said captured subsequent fingerprint images; and
    wherein said processor performs a subsequent image darkness test.

31. The fingerprint scanner of claim 30, wherein said camera repeats the capture of subsequent initial fingerprint images, the capture of subsequent first intermediate fingerprint images, and application of subsequent companding curves, until an acceptable darkness level results.

32. The fingerprint scanner of claim 17, wherein said plurality of image darkness lines arranged in pairs includes a first pair of image darkness test lines, said first pair of image darkness test lines including a first image darkness test line and a second image darkness test line, wherein said first image darkness test line intersects with said second image darkness test line.

33. A method of capturing an acceptable fingerprint image comprising the steps of:
    (a) capturing a first intermediate fingerprint image at a first intermediate image integration time;
    (b) performing an image darkness test, including calculating average darkness values for a plurality of image darkness lines arranged in pairs of image darkness lines, said pairs of image darkness lines situated within an expected image capture region; and
    (c) performing an image definition test.

34. The method of claim 33, further comprising a step (d) of capturing a subsequent intermediate fingerprint image at a subsequent intermediate image integration time prior to said step (c) when said step (b) results in an unacceptable darkness level.

35. The method of claim 34, further comprising repeating said step (d) at additional subsequent intermediate integration times until said step (b) results in an acceptable darkness level.

36. The method of claim 33, wherein the plurality of image darkness lines arranged in pairs includes a first pair of image darkness test lines, the first pair including a first image darkness test line and a second image darkness test line, wherein the first image darkness test line intersects with the second image darkness test line, wherein step (b) comprises:
    calculating average darkness values for the first image darkness test line and the second image darkness test line.

37. A fingerprint scanner for capturing an acceptable fingerprint image comprising:
    means for capturing an initial fingerprint image at a nominal image integration time and for capturing a first intermediate fingerprint image at a first intermediate image integration time; and
    means for performing an image darkness test and an image definition test;
    said means for performing a fingerprint image derkness test including means for calculating average darkness values for a plurality of image derkness lines arrangs in pairs of image darkness lines, said pairs of image darkness line situated within an expected image capture region.

38. The fingerprint scanner of claim 37, wherein said plurality of image darkness lines arranged in pairs includes a first pair of image darkness test lines, said first pair including a first image darkness test line and a second image darkness test line, wherein said first image darkness test line intersects with said second image darkness test line.

39. A system controller for use in a fingerprint scanner, wherein said system controller performs a fingerprint image darkness test, and performs an definition test;
    wherin said system controller calculates averags darkness values for a plurality of image darkness lines arranged in pairs of image darkness line, said pairs of image darkness lines situated within an expected image capture region.

40. The system controller of claim 39, wherein said system controller calculates average darkness values for a plurality of image darkness test lines within a fingerprint image and verifies that overall image darkness and image darkness distribution are both acceptable.

41. The system controller of claim 39, wherein said system controller determines a ridge count for each of a plurality of image definition test lines within a fingerprint image and verifies that image definition is acceptable based on the ridge count for each of the plurality of image definition test lines.

42. The system controller of claim 39, wherein said plurality of image darkness lines arranged in pairs includes a first pair of image darkness test lines, said first pair including a first image darkness test line and a second image darkness test line, wherein said first image darkness test line intersects with said second image darkness test line.

43. A method of capturing an acceptable fingerprint image comprising the steps of:
    (a) capturing an initial fingerprint image at a nominal image integration time;
    (b) capturing a first intermediate fingerprint image at a first intermediate image integration time;
    (c) performing an image darkness test; and
    (d) performing an image definition test;
    wherein said step (d) comprises the steps of:
        (i) determining a ridge count for each of a plurality of image definition test lines; and
        (j) verifying that image definition is acceptable based on the ridge counts determined in said step (i).

44. The method of claim 43, wherein said step (i) further comprises determining a ridge count for each of a predetermined number of a first set of image definition test lines and for each of a predetermined number of a second set of image definition test lines.

45. The method of claim 44, wherein said first set of image definition test lines comprises five vertical image definition test lines and said second set of image definition test lines comprises seven horizontal image definition test lines, and wherein said step (i) further comprises determining a ridge count for each of said five vertical image definition test lines and for each of said seven of horizontal image definition test lines.

46. A fingerprint scanner for capturing an acceptable fingerprint image comprising:

a camera that captures an initial fingerprint image at a nominal image integration time and captures a first intermediate fingerprint image at a first intermediate image integration time; and a processor that performs an image darkness test and an image definition test;

wherein said processor determines a ridge count for each of a plurality of image definition test lines and verifies that image definition is acceptable based on the ridge count for each of the plurality of image definition test lines.

47. The fingerprint scanner of claim 46, wherein said processor determines a ridge count for each of a predetermined number of vertical image definition test lines and for each of a predetermined number of horizontal image definition test lines.

48. The fingerprint scanner of claim 47, wherein said processor determines a ridge count for each of five vertical image definition test lines and for each of seven of horizontal image definition test lines.

49. A system controller for use in a fingerprint scanner, wherein said system controller performs an image darkness test, and performs an image definition test;

wherein said system controller determines a ridge count for each of a plurality of image definition test lines within a fingerprint image and verifies that image definition is acceptable based on the ridge count for each of the plurality of image definition test lines.

* * * * *